(12) United States Patent
Nakanishi et al.

(10) Patent No.: US 7,071,800 B2
(45) Date of Patent: Jul. 4, 2006

(54) ACTUATORS WITH INTEGRATED CIRCUITS

(75) Inventors: Shingo Nakanishi, Aichi-ken (JP); Yoshiki Ito, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 148 days.

(21) Appl. No.: 10/785,019

(22) Filed: Feb. 25, 2004

(65) Prior Publication Data

US 2004/0164827 A1    Aug. 26, 2004

(30) Foreign Application Priority Data

Feb. 26, 2003    (JP)    ............... 2003-049513

(51) Int. Cl.
*H01F 7/08*    (2006.01)
(52) U.S. Cl. ...................... 335/225; 310/216
(58) Field of Classification Search ............ 335/128, 335/225, 228; 251/129.01
See application file for complete search history.

(56) References Cited

U.S. PATENT DOCUMENTS 5,870,010 A * 2/1999 Ackermann ................. 335/229
5,945,753 A * 8/1999 Maegawa et al. ......... 310/68 B

FOREIGN PATENT DOCUMENTS

JP    07307435    11/1995
JP    07307435 A * 11/1995

* cited by examiner

*Primary Examiner*—Elvin Enad
*Assistant Examiner*—Bernard Rojas
(74) *Attorney, Agent, or Firm*—Dennison, Schultz, Dougherty & MacDonald

(57) ABSTRACT

An actuator includes a coil and an IC attached to a core. The coil produces a magnetic field and the core provides a path for the magnetic field. A rotor is rotatably mounted within the core, so that the rotor rotates in response to the magnetic field produced by the coil. The IC is electrically connected to the coil. The distance between the IC and the coil is determined based on a permissible temperature of the IC, so that the IC is not heated substantially in excess of the permissible temperature.

17 Claims, 5 Drawing Sheets

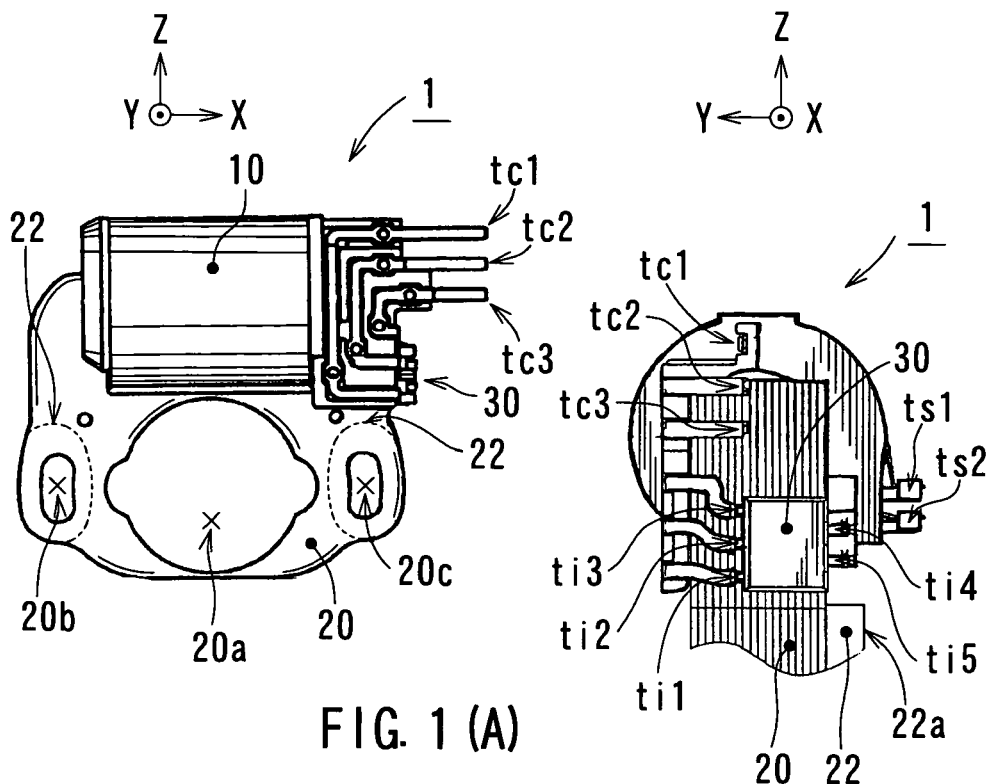
FIG. 1 (A)
FIG. 1 (B)
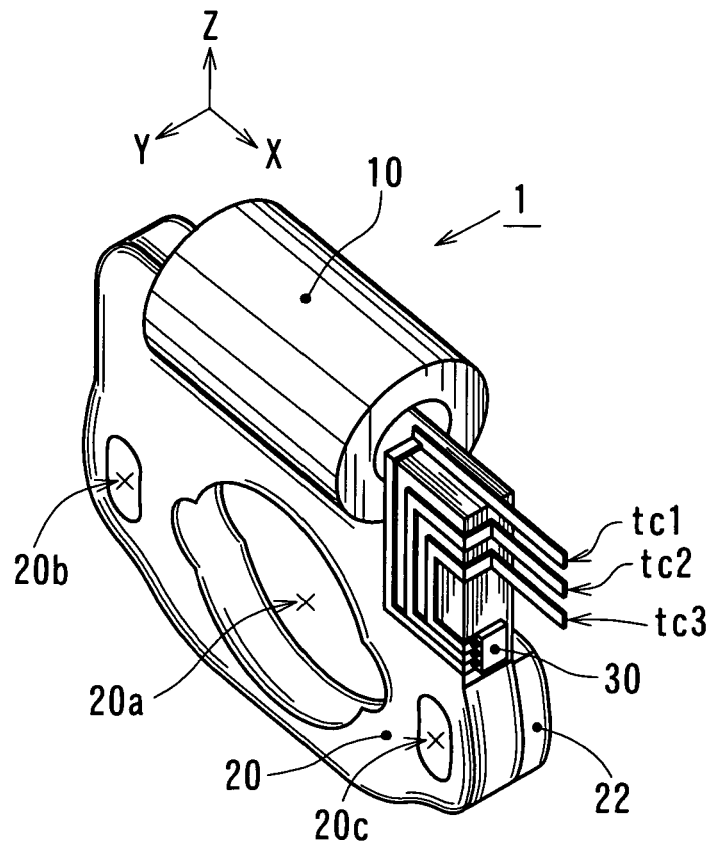
FIG. 1 (C)

ACTUATORS WITH INTEGRATED CIRCUITS

This application claims priorities to Japanese patent application serial number 2003-049513, the contents of which are incorporated herein by reference.

BACKGROUND OF THE INVENTION

1. Field of the Invention

The present invention relates to actuators that have ICs (integrated circuits) integrated with the actuators.

2. Description of the Related Art

Heretofore, various control units, e.g. control units of automobiles, are known in order to control various actuators, such as electric motors and solenoid valves. In general, a control unit of an automobile has a CPU. Therefore, in order to reliably and stably operate the CPU, the control unit is located at an appropriate place within the automobile, where the CPU may suffer from less external influence. For example, such a place may be chosen within a vehicle cabin to ensure a more narrow range of possible variations of temperature, a smaller vibration level, and less chance for immersion in water. In general however, the actuator is either directly mounted to the object to be actuated, e.g., an automobile engine and a transmission, or is located in the vicinity of such an object. Therefore, long electrical line(s) have been used for connecting the control unit to the actuator.

In addition, the known control units have a circuit that produces a drive current for directly driving the actuator. Such drive currents have been supplied to the actuator via the electrical line(s). However, a considerable loss of power has typically been caused due to the long electrical line(s).

In recent years, there have been proposed actuators containing circuits, e.g., ICs, for producing drive currents. The control unit only has to supply a control signal having a relatively small current to the actuator via the electrical line(s). These types of actuators are known as "actuators integrated with ICs." Japanese Laid-Open Patent Publication No. 7-307435 teaches such an actuator.

In case of the actuator disclosed in the above publication, typically, a current flowing through the actuator is on the order of a few hundreds of mA. Therefore, the temperature produced by the actuator usually does not exceed a permissible temperature range for the IC. For this reason, the IC is positioned between a connector and a coil such that electrical lines connecting the connector, the IC, and the coil, have the shortest practical lengths.

Most recently however, new types of actuators requiring a current in the range of 2–3 A have been developed and used practically. These types of actuators may generate a large amount of heat. Therefore, in situations where these types of actuators have been used and the IC is positioned between a connector and a coil such that electrical lines connecting the connector, the IC, and the coil, have the shortest practical lengths, there is a possibility that the IC may be heated beyond a permissible temperature range.

SUMMARY OF THE INVENTION

It is accordingly an object of the present invention to teach improved IC integrated actuators that can inhibit or minimize the potential temperature rise of the ICs.

According to one aspect of the present teachings, actuators are taught that include a core. A coil is attached to the core in order to produce a magnetic field. The core provides a path for the magnetic field. A rotor is rotatably mounted within the core, so that the rotor rotates in response to the magnetic field produced by the coil. An IC is attached to the core and is electrically connected to the coil. The distance between the IC and the coil is determined based on a permissible operating temperature range of the IC, so that the IC is not heated to substantially exceed the permissible temperature range.

Therefore, the IC may be located in such a way as to inhibit the IC from being heated to exceed a permissible temperature. As a result, the IC can more reliably operate and control the magnetic field of the coil.

In one embodiment, the actuators may further include a connector connected to the IC. A power source voltage and a control signal are supplied to the IC via the connector. The IC may supply an excitation current to the coil based upon the control signal. The excitation current may be greater than the current of the control signal.

In another aspect of the present teachings, the coil is positioned on one side of the core and the IC is positioned on the side opposite to the coil. With this arrangement, the IC can be positioned at the furthest location away from the coil. Therefore, the IC is less likely to suffer a substantial influence from the heat of the coil.

In another aspect of the present teachings, the IC is positioned adjacent to a part of the core that is adapted to contact a heat dissipation member.

Also with this arrangement, the IC may not substantially suffer from the influence of the heat generated by the coil. The heat conducted to the part of the core containing the IC can be effectively dissipated via the heat dissipation member.

In another aspect of the present teachings, the IC is positioned such that the distance between the center of the IC and the part of the core that is adapted to contact a heat dissipation member is smaller than the distance between the center of the IC and a central axis of the coil. In other words, the IC is located closer to the heat dissipation member than to the coil.

This arrangement is also effective to aid in preventing the heat of the coil from having a substantial influence upon the IC, because the IC is positioned nearer to the part of the core contacting the heat dissipation member than the IC is to the coil.

For example, the heat dissipation member may be a part of an object driven by the actuator. In one embodiment, the object may be a throttle device that supplies intake air to an internal combustion engine of an automobile. The throttle device may have a throttle body that is preferably made of high heat conductivity material.

In another aspect of the present teachings, a molding material is molded integrally with the actuator. The IC is then fixed in position relative to the core by the molding material. With this arrangement, the IC can be positioned to reliably contact the core.

Preferably, the molding material substantially encloses the IC and is made of heat-resistant resin.

In another aspect of the present teachings, the actuator further includes a spacer disposed between the core and an object driven by the actuator, so that part of the core contacts the heat dissipation member via the spacer. Preferably, the spacer is made of high heat conductivity material.

BRIEF DESCRIPTION OF THE DRAWINGS

FIGS. 1(A), 1(B), and 1(C), are respectively, a front view, a partial right side view, and a perspective view, of a representative actuator.

DETAILED DESCRIPTION OF THE INVENTION

Each of the additional features and teachings disclosed above and below may be utilized separately or in conjunction with other features and teachings to provide improved actuators and methods of using such actuators. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment will now be described with reference to the drawings.

(General Construction)

Figure 2A:
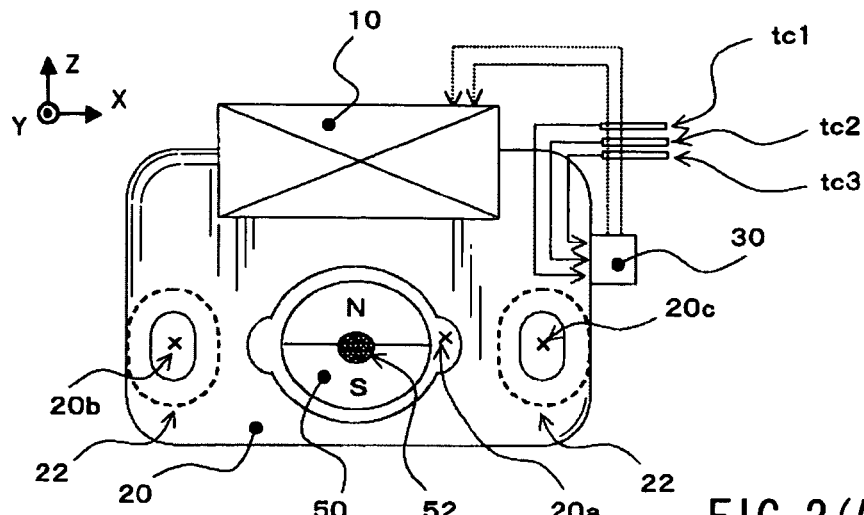
FIG. 2(A) is a schematic front view of the representative actuator.
Figure 2B:
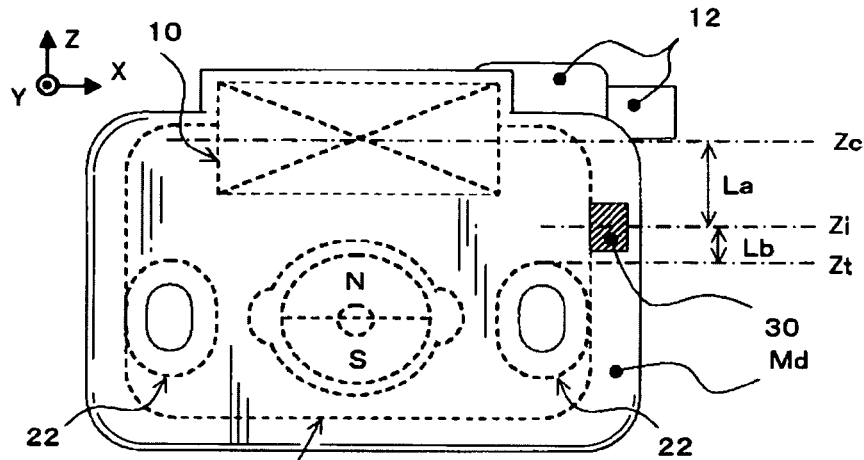
FIG. 2(B) is a schematic front view of alternative embodiment of the representative actuator that is covered with a molding material.
Figure 2C:
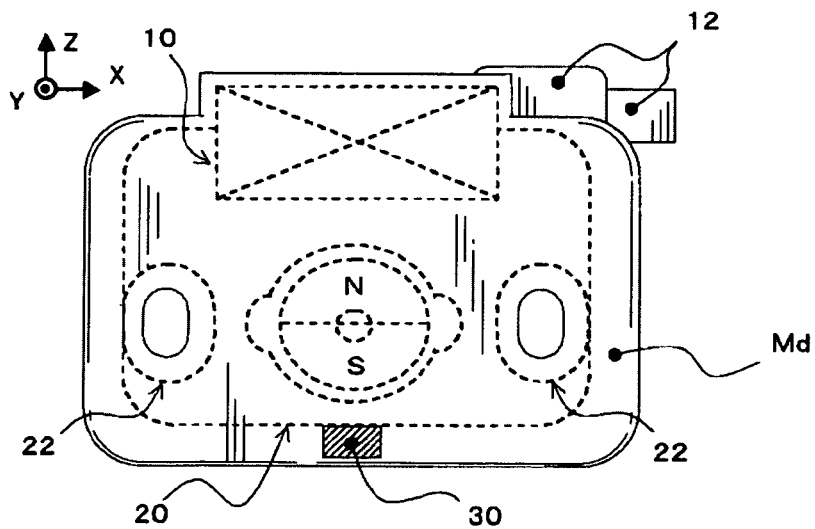
FIG. 2(C) is a schematic front view similar to FIG. 2(B) but showing another alternative embodiment.

FIGS. 1(A), 1(B), and 1(C), respectively show a front view, a partial side view, and a perspective view of a representative actuator 1 that has an IC (integrated circuit) 30 integrated with the actuator 1. The actuator 1 includes a coil 10, a core 20, and terminals tc1, tc2, and tc3, in addition to the IC circuit 30. The coil 10 is disposed on one side (upper side as viewed in FIG. 1(A)) of the core 20. The terminal tc1 may be connected to a power source. For example, the power source voltage may be supplied from a battery of an automobile (not shown). The terminal tc2 may receive a control signal from a control unit (not shown). For example, the control signal may be of 0 to 5 V and on the order of several dozen mA. The terminal tc3 is connected to a reference potential (ground (GND)). The terminals tc1 to tc3 are disposed within a connector 12 that is shown in FIGS. 2(B) and 2(C).

The IC circuit 30 has input terminals ti1, ti2, and ti3, and output terminals ti4 and ti5. The terminal ti1 is connected to the terminal tc1 and receives the voltage supplied by a power source. The terminal ti2 is connected to the terminal tc2 and receives a control signal. The terminal ti3 is connected to the terminal tc3, so that the terminal ti3 is connected to a reference potential. The terminal ti4 is connected to one of two opposite terminals of the coil 10 and the terminal ti5 is connected to the other terminal of the coil 10. A current is supplied to the coil 10 via the terminals ti4 and ti5 and flows through the coil 10 in a predetermined direction.

A part of the core 20 is inserted into the coil 10 so as to provide a path for a magnetic field produced by the coil 10. Through holes 20a, 20b, and 20c, are formed in the core 20. As shown in FIG. 2(A), a rotor 50 (e.g., magnetic) is inserted into the through hole 20a that is positioned centrally of the lower portion of the core 20. The through holes 20b and 20c are positioned on both sides of the through hole 20a and are adapted to receive screws Sb and Sc, respectively, that are used to mount the actuator 1 to another member or device. In this representative embodiment, the actuator 1 is configured to be mounted to the throttle body 60 (see FIG. 3) of a throttle device that supplies intake air to an internal combustion engine of an automobile (not shown). As shown in FIGS. 1(A) to 1(C), base plates 22 are attached to a surface of the core 20. The surface of the core 20 may oppose the throttle body 60. In this way, the actuator 1 may contact the throttle body 60 via contact surfaces 22a (see FIG. 1(B)) of the base plates 22 when the actuator 1 is mounted to the throttle body 60. Thus, the base plates 22 may serve as spacers between the actuator 1 and the throttle body 60.

Although the base plates 22 are attached to the core 20 of the actuator 1, the base plates 22 may be attached to the throttle body 60. Alternatively, the base plates 22 may be separate members that are interposed between the actuator and the throttle body 60 during the mounting operation.

Figure 3:
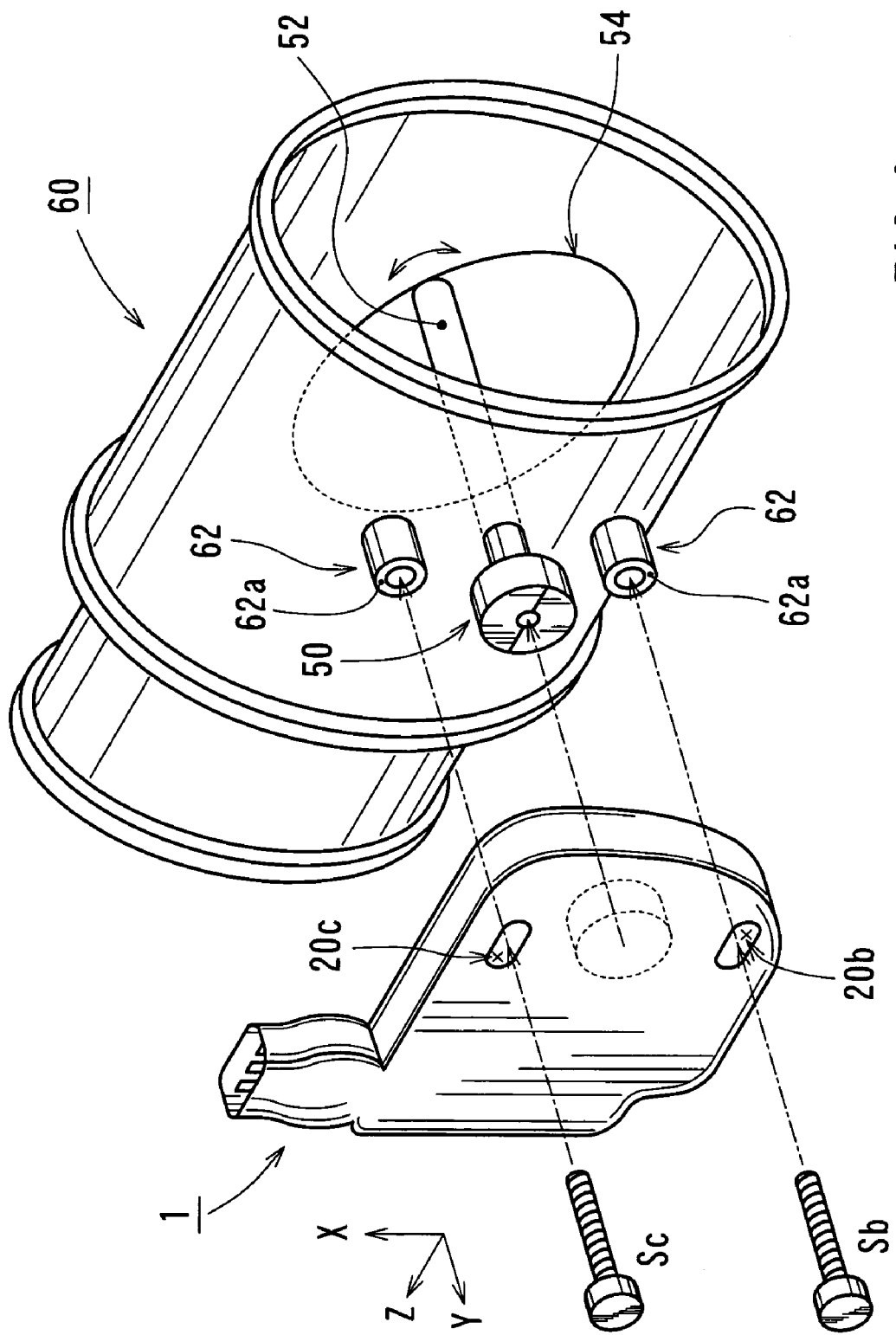
FIG. 3 is an exploded perspective view of a part of the representative actuator and a throttle device that is adapted to be actuated by the actuator.

Preferably, the throttle body 60 is made of high heat conductivity material, e.g., metal. In addition, the base plates 22 may be replaced with mount projections 62 formed integrally with the throttle body 60 and having mount surfaces 62a, as shown in FIG. 3. In the case where the throttle body 60 is made of low heat conductivity material, e.g., resin, separate base plates each having a large surface area may be interposed between the mount surfaces 62a and the actuator 1. The large surface area of the separate base plates can aid in efficiently dissipating heat from the coil. In this way, potentially the throttle body 60 and/or one or more separate members, not integral to either the throttle body 60 or the actuator 1, can be utilized as a heat dissipation member(s).

(Arrangement of IC)

Referring to FIG. 2(A), the representative actuator is shown in a schematic view. As shown in FIG. 2(A), the rotor 50 that is inserted into the through hole 20a has a shaft 52. The shaft 52 is secured to the rotor 50 and extends along the central axis of the rotor 50, so that the shaft 52 rotates due to the rotation of the rotor 50, as shown in FIG. 3. When no current is supplied to the coil 10, the rotor 50 assumes a position as shown in FIG. 2(A). When the current is supplied to the coil 10, the rotor 50 may rotate in either a clockwise direction or a counterclockwise direction in response to the magnetic field that is produced by the coil 10. When the supply of current to the coil 10 is interrupted, the rotor 50 returns to the position show in FIG. 2(A).

FIG. 2(B) shows an alternative embodiment in which the actuator 1 is molded with a molding material Md, so that the molding material Md encloses the IC 30. Preferably, the molding material Md is made of heat-resistant resin. In this way, the IC 30 is directly attached to and directly contacts the core 20. Typically in known embodiments, an IC is packaged in a material that may be deformed in response to changes in the temperature. More specifically, the package may thermally expand and contract. It is possible that the package may be cracked or broken due to the resulting deformation. In contrast, according to the embodiment shown in FIG. 2(B), the IC 30 directly contacts the core 20 that is preferably made of iron and is relatively hard. In addition, the molding material Md securely holds the IC 30. Therefore, any possible deformation of the package may be inhibited or minimized by the molding material Md. The terminals tc1 to tc3 may be received within a connector 12 that is made of resin.

Possible arrangement of the IC 30 will be described with reference to FIGS. 2(B) and 2(C). In the arrangement shown in FIG. 2(B), the IC 30 is positioned in the vicinity of one of the base plates 22. As noted above, the base plate 22 may contact another member or device (e.g. such as the throttle body 60 in this embodiment) that can dissipate heat, so that heat generated by the coil 10 may be conducted to the core 20, through the base plates 22, and further to the heat dissipation member. In this situation, the base plates 22 and the heat dissipation member may preferably be made of high heat conductivity material. The position of the IC 30 is preferably determined such that a distance Lb is smaller than a distance La as indicated in FIG. 2(B). Here, the distance La is measured from a central axis Zc of the coil 10 to a centerline Zi of the IC 30. The centerline Zi is parallel to the central axis Zc. The distance Lb is measured from the centerline Zi of the IC 30 to a line Z t that extends along an edge of one of the base plates 22 (i.e., any part of the core 20 that contacts the heat dissipation member). The line Zt also is parallel to the central axis Zc of the coil 10. With this configuration, the heat dissipation ability of the heat dissipation member through the base plates 22 can be accomplished and possible temperature increase of the IC 30 may be inhibited or minimized. In addition, by the positioning of the IC 30 within a range between the central axis Zc of the coil 10 and the line Zt, the distance from the IC 30 to either the connector 12 and/or the coil 10 may be moderately limited and not unnecessarily long.

FIG. 2(C) shows an alternative arrangement of the IC 30. In FIG. 2(C), the IC 30 is positioned on one side of the core 20, the side opposite to the coil 10. This arrangement enables the IC 30 to be as far as possible from the heat generating coil 10 and yet still contact the core 20. Therefore, the increase of temperature of the IC 30 may be effectively inhibited or minimized. Although the arrangement shown in FIG. 2(C) may have longer wiring lengths between the connector 12 and the IC 30, and between the IC 30 and the coil 10, in comparison to the alternative arrangement shown in FIG. 2B, the wiring length between the connector 12 and the IC 30 may be shortened by locating the connector 12 to a position closer to the vicinity of IC 30.

(Applications of Actuator)

FIG. 3 shows an application of the representative actuator 1 to the throttle body 60 of the throttle device. As noted previously, the throttle body 60 may be adapted to supply intake air to an automobile engine (not shown).

As described previously, the actuator 1 may be mounted to the throttle body 60 by means of the screws Sb and Sc. The base plates 22 of the actuator contact the respective mount surfaces 62a of the mount projections 62 that are formed on the throttle body 60. A throttle valve 54 is disposed within an intake passage defined in the throttle body 60 and is attached to the shaft 52 of the rotor 50. Therefore, the throttle valve 54 may open and close the intake passage as the shaft 52 rotates.

Although the actuator 1 has been applied to the throttle device in this representative embodiment, the actuator 1 is not limited to throttle devices and may be applied to other machines and apparatus.

(Circuit Configuration IC)

Figure 4:
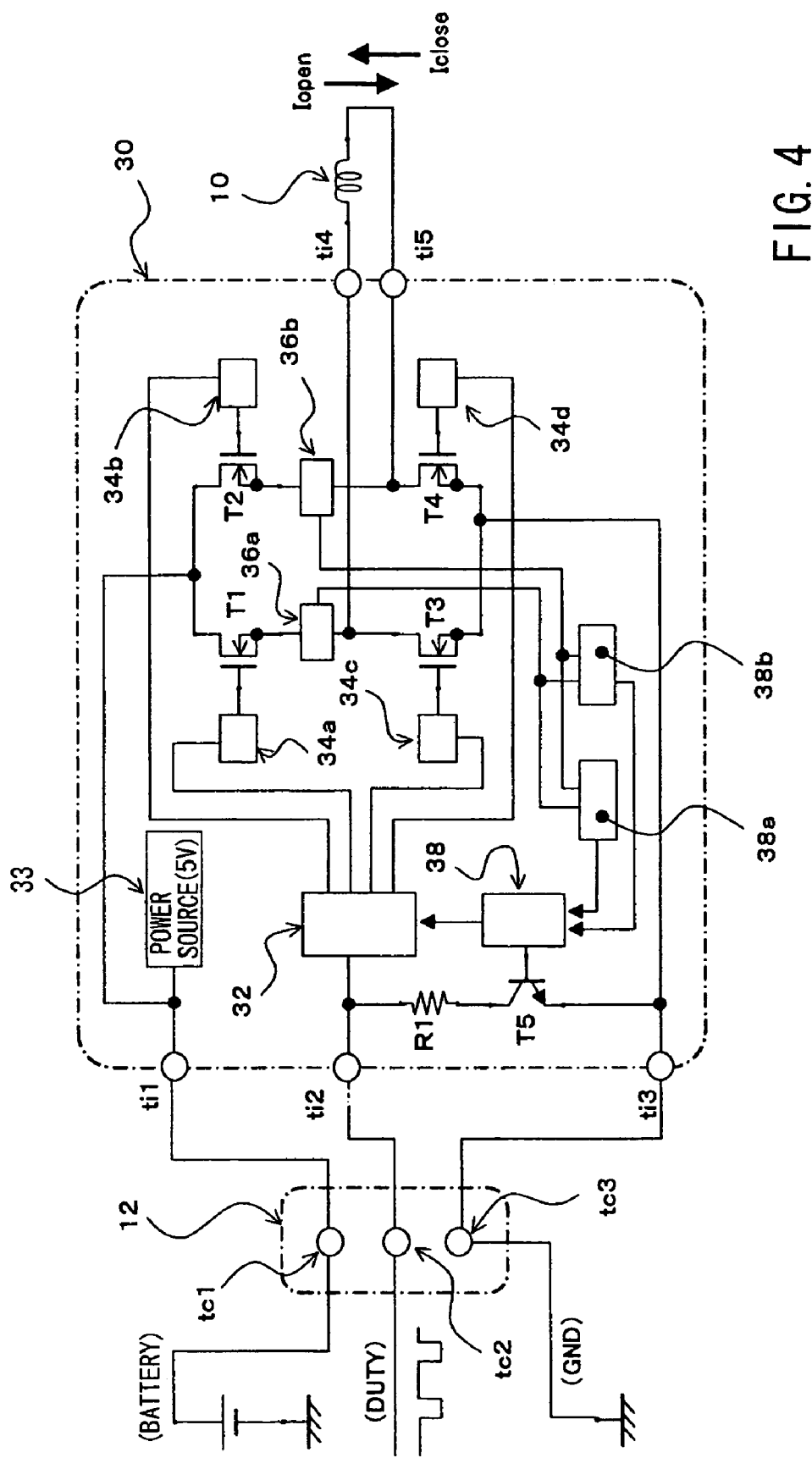
FIG. 4 is a circuit configuration of a representative IC.

A representative circuit configuration of the IC 30 will now be described with reference to FIG. 4. As described previously, the connector 12 has terminals tc1 to tc3. The terminal tc1 is connected to a positive terminal of a battery as a power source. The terminal tc3 is connected to a reference potential (ground (GND)). The terminal tc2 is connected to a control unit (not shown). For example, the control unit may be an engine control unit of an automobile. The control unit may output a control signal (e.g., a duty pulse signal) that is inputted to the terminal tc2 from a control unit.

The terminal tc1 is connected to the terminal ti1 of the IC 30. The terminal ti1 is connected to an H-bridge circuit. The H-bridge circuit includes a 5V power source 33 and power MOS transistors (hereinafter called "MOSTrs) T1, T2, T3, and T4. The terminal ti1 is connected to the H-bridge circuit on the upstream side, where the MOSTrs T1 and T2 are connected to each other. The 5V power source 33 serves to supply power to small signal processing circuits, e.g., an input processing circuit 32 and a self-diagnostic circuit 38, other than the MOSTrs T1 to T4 of the IC 30.

The terminal ti3 of the IC 30 is connected to the terminal tc3 and provides a reference potential (GND) for various elements and circuits of the IC 30.

The terminal ti4 of the IC 30 is connected to one of the terminals of the coil 10. The other terminal of the coil 10 is connected to the terminal ti5. For example, when the current flows through the coil 10 in the direction Iopen shown in FIG. 4, the actuator 1 may rotate the throttle valve 54 (see FIG. 3) in an opening direction. On the other hand, when the current flows through the coil 10 in the opposite direction to Iopen, the direction Iclose shown in FIG. 4, the actuator may rotate the throttle valve 54 in a closing direction.

The terminal ti2 of the IC 30 is connected to the terminal tc2, so that the control signal from the control unit may be inputted to the terminal ti2. The input processing circuit 32 converts the control signal into a suitable output signal to drive the H-bridge circuit that includes the MOSTrs T1 to T4. Pre-drivers (hereinafter called "PrDrvs") 34a, 34b, 34c, and 34d, respectively serve to control the ON and/or OFF function of the MOSTrs T1, T2, T3, and T4.

For example, when the ratio of the low level portion of the duty pulse signal inputted to the terminal tc2 is less than 50%, the current corresponding to such ratio may flow in the direction Iclose in order to close the throttle valve 54. In this case, the input processing circuit 32 performs the cycle control of the current path formed by the MOSTrs T1 and T4 and the current path formed by the MOSTrs T2 and T3 (by turning ON and OFF at a duty corresponding to a required current flowing in the direction Iclose), such that an appropriate current flows in the direction of Iclose. Here, the MOSTrs T1 and T4 are simultaneously driven and MOSTrs T2 and T3 are also simultaneously. In order to close the throttle valve, the cycle of MOSTrs T1 and T4 is controlled such that ON period is short and OFF period is long, while the cycle of MOSTrs T2 and T3 is controlled such that ON period is long and OFF period is short.

On the other hand, when the ratio of the low level portion of the duty pulse signal inputted to the terminal tc2 is 50% or more, the current corresponding to such ratio may flow in the direction Iopen in order to open the throttle valve 54. Also in this case, the input processing circuit 32 performs the cycle control of a current path formed by the MOSTrs T1 and T4 and of a current path formed by the MOSTrs T2 and T3. In order to open the throttle valve 54, the cycle of MOSTrs T1 and T4 is controlled such that ON period is long and OFF period is short, while the cycle of MOSTrs T2 and T4 is controlled such that ON period is short and an OFF period is long.

Current detection circuits 36a and 36b serve to respectively detect the current flowing in the direction Iopen and the current flowing in the direction Iclose. The outputs of the current detection circuits 36a and 36b are inputted to a first abnormal condition detection circuit 38a and a second abnormal condition detection circuit 38b. For example, the first abnormal condition detection circuit 38a may detect a break in the coil 10 and the second abnormal condition detection circuit 38b may detect a short-circuiting of the coil 10.

The outputs of the first abnormal condition detection circuit 38a and the second abnormal condition detection circuit 38b are inputted to the self-diagnostic circuit 38. When the abnormal condition has been detected by either the first abnormal condition detection circuit 38a or the second abnormal condition detection circuit 38b, the self-diagnostic circuit 38 turns on a transistor T5, which sends a signal to the control unit in order to indicate an abnormal condition, and defaults the output of the input processing circuit 32 (e.g. maintaining the output as OFF).

Among various elements of the IC 30, the 5V power source 33 and the output transistors MOSTrs T1 to T4 (through which relatively large current flows) may generate larger amounts of heat than the other elements.

(Effects to Inhibit Increase of Temperature)

Figure 5A:
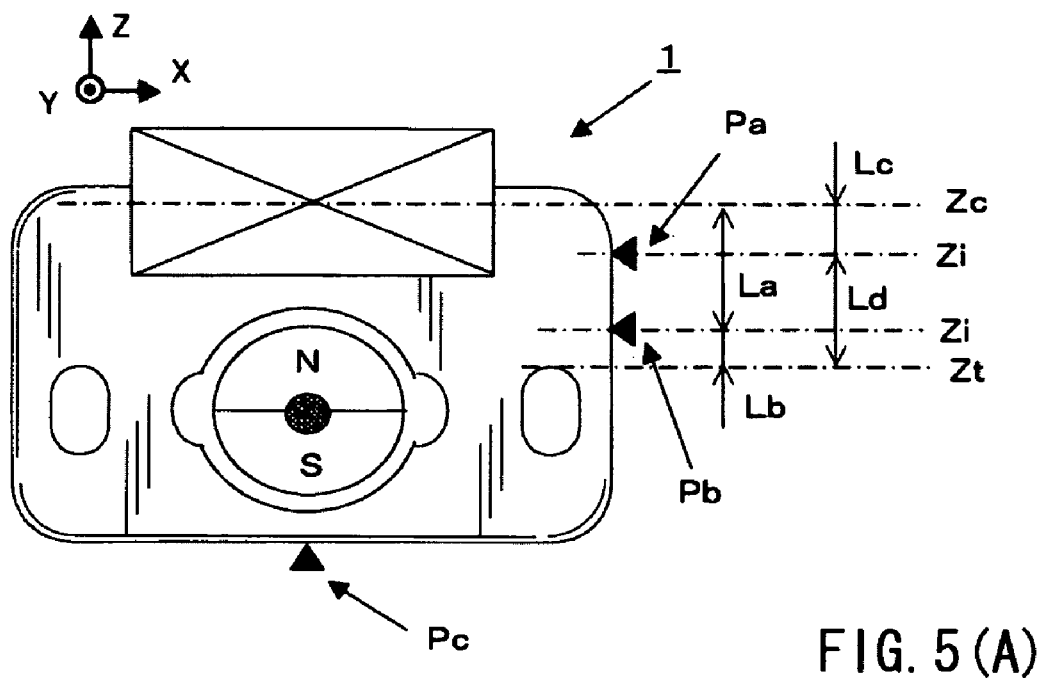
FIG. 5(A) is an explanatory view showing various possible mounting positions of the IC to a core.
Figure 5B:
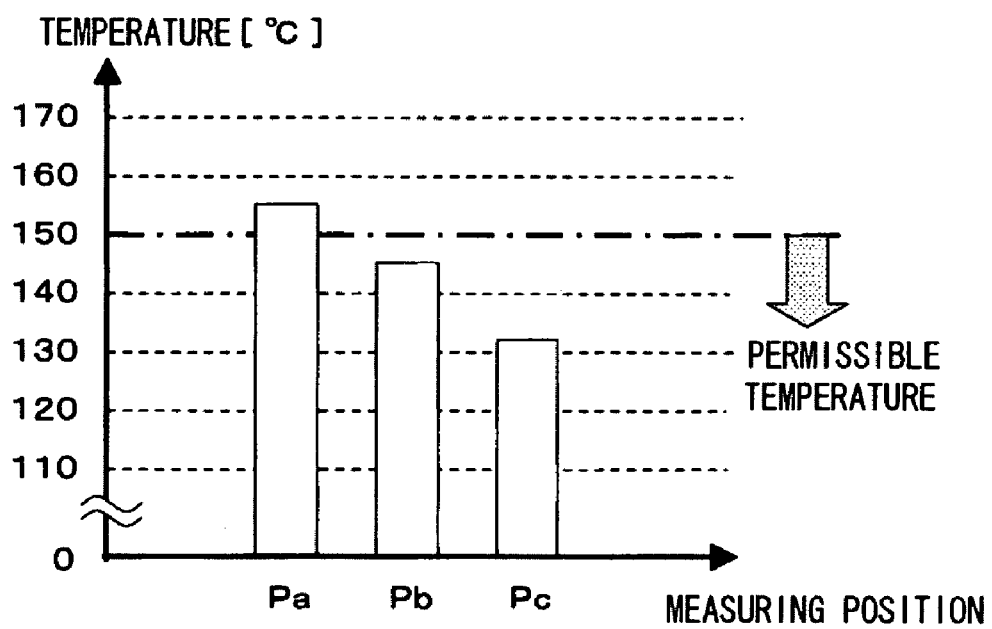
FIG. 5(B) is a graph showing experimental results of measurement of temperature of the IC measured at the positions shown in FIG. 5(A).

The effect to inhibit increase of temperature according to the representative embodiment will now be described with reference to FIGS. 5(A) and 5(B). FIG. 5(B) is a graph that shows the results of the measurement of the temperature of the IC 30 when the IC 30 is located at three different positions Pa, Pb, and Pc, shown in FIG. 5(A). The measurements have all been performed under the condition of maximum current flow through the coil 10 (e.g., other conditions include an environmental temperature of 120° C. and a battery voltage of 16V).

The position Pc corresponds to the position shown in FIG. 2(C) and the position Pb corresponds to the position shown in FIG. 2(B). The position Pa is for the purpose of comparison with the results obtained at the positions Pc and Pb. The position Pa is chosen such that a distance Lc between the centerline Zi of the IC 30 and central axis Zc of the coil 10 is smaller than a distance Ld between the centerline Zi and the line Zt that extends along an edge of the one of the base plates 22 (or a part of the core 20 that contacts the heat dissipation member).

As shown in FIG. 5(B), the results of measurements have indicated that the temperature of the IC 30 does not exceed a permissible temperature range (e.g., 150° C.) if the IC 30 is positioned at the positions Pb and Pc. However, in case where the IC 30 is located at position Pa, the IC was heated in excess of the permissible temperature.

Although the present invention has been described in connection with the representative embodiments, the present invention should not be limited to the representative embodiments described. For example, the actuator has been applied to many other types of machines and apparatus, such as motors and solenoid valves, in addition to the throttle device. In addition, the circuit configuration of the IC 30 may not be limited to the configuration shown in FIG. 4. Furthermore, the numerical values, e.g., temperature values and electric values, in the description of the representative embodiments should be considered to be only representative values. Actual values should be determined by brief experimentation for each particular embodiment.

The invention claimed is:

1. An actuator comprising:
   a core;
   a coil attached to the core and arranged and constructed to produce a magnetic field, wherein the core provides a path of the magnetic field;
   a rotor rotatably mounted within the core, so that the rotor rotates in response to the magnetic field produced by the coil; and
   an IC attached to the core and electrically connected to the coil, wherein the distance between the IC and the coil is determined based on a permissible temperature of the IC, so that the IC is not heated to substantially exceed the permissible temperature;
   wherein the IC is positioned adjacent to a part of the core that is adapted to contact a heat dissipation member; and
   wherein the heat dissipation member is a part of an object that is driven by the actuator.

2. An actuator as in claim 1, further including a connector connected to the IC, so that a power source voltage and a control signal are supplied to the IC via the connector, wherein the IC supplies an excitation current to the coil based upon the control signal.

3. An actuator as in claim 1, wherein the coil is positioned on one side of the core.

4. An actuator as in claim 3, wherein the IC is positioned on the side opposite to the coil.

5. An actuator as in claim 1, wherein the IC is positioned such that a distance between a center of the IC and a part of the core that is adapted to contact a heat dissipation member is smaller than a distance between the center of the IC and a central axis of the coil.

6. An actuator as in claim 1, wherein a molding material is molded integrally with the actuator, so that the IC is fixed in position relative to the core by the molding material.

7. An actuator as in claim 6, wherein the molding material substantially encloses the IC.

8. An actuator as in claim 6, wherein the molding material is made of heat-resistant resin.

9. An actuator as in claim 1, wherein the object driven by the actuator is a throttle device that includes a throttle body as the heat dissipation member.

10. An actuator as in claim 9, wherein the throttle body is made of material that has high heat conductivity.

11. An actuator comprising:
    a core;
    a coil attached to the core and arranged and constructed to produce a magnetic field, wherein the core provides a path of the magnetic field;
    a rotor rotatably mounted within the core, so that the rotor rotates in response to the magnetic field produced by the coil; and an IC attached to the core and electrically connected to the coil, wherein the distance between the IC and the coil is determined based on a permissible temperature of the IC, so that the IC is not heated to substantially exceed the permissible temperature;

wherein the IC is positioned adjacent to a part of the core that is adapted to contact a heat dissipation member; and a spacer disposed between the core and an object driven by the actuator, so that the part of the core contacts the heat dissipation member via the spacer.

12. An actuator as in claim 11, wherein the spacer is made of material that has high heat conductivity.

13. An actuator comprising:

a core;

a coil attached to the core and arranged and constructed to produce a magnetic field, wherein the core provides a path of the magnetic field;

a rotor rotatably mounted within the core, so that the rotor rotates in response to the magnetic field produced by the coil;

an IC attached to the core and electrically connected to the coil, wherein the distance between the IC and the coil is determined based on a permissible temperature of the IC, so that the IC is not heated to substantially exceed the permissible temperature;

wherein the IC is positioned such that a distance between a center of the IC and a part of the core that is adapted to contact a heat dissipation member is smaller than a distance between the center of the IC and a central axis of the coil; and wherein the heat dissipation member is a part of an object that is driven by the actuator.

14. An actuator as in claim 13, wherein the object driven by the actuator is a throttle device that includes a throttle body as the heat dissipation member.

15. An actuator as in claim 14, wherein the throttle body is made of material that has high heat conductivity.

16. An actuator comprising:

a core;

a coil attached to the core and arranged and constructed to produce a magnetic field, wherein the core provides a path of the magnetic field;

a rotor rotatably mounted within the core, so that the rotor rotates in response to the magnetic field produced by the coil;

an IC attached to the core and electrically connected to the coil, wherein the distance between the IC and the coil is determined based on a permissible temperature of the IC, so that the IC is not heated to substantially exceed the permissible temperature;

wherein the IC is positioned such that a distance between a center of the IC and a part of the core that is adapted to contact a heat dissipation member is smaller than a distance between the center of the IC and a central axis of the coil; and a spacer disposed between the core and an object driven by the actuator, so that the part of the core contacts the heat dissipation member via the spacer.

17. An actuator as in claim 16, wherein the spacer is made of material that has high heat conductivity.

* * * * *